(12) United States Patent
Felkar et al.

(10) Patent No.: US 7,839,795 B2
(45) Date of Patent: Nov. 23, 2010

(54) CARRIER ETHERNET WITH FAULT NOTIFICATION

(75) Inventors: Stacey Felkar, Kanata (CA); Frederic Perras, Cantley (CA); Ken Young, Kanata (CA); Chris Barrett, Nepean (CA)

(73) Assignee: Ciena Corporation, Linthicum, MD (US)

( * ) Notice: Subject to any disclaimer, the term of this patent is extended or adjusted under 35 U.S.C. 154(b) by 187 days.

(21) Appl. No.: 12/002,466

(22) Filed: Dec. 17, 2007

(65) Prior Publication Data

US 2009/0154364 A1    Jun. 18, 2009

(51) Int. Cl.
*G06F 11/07* (2006.01)
*G06F 11/00* (2006.01)

(52) U.S. Cl. .................. 370/245; 370/216

(58) Field of Classification Search .......... 370/216, 370/245, 241.1, 248, 249, 242, 252; 709/224
See application file for complete search history.

(56) References Cited

U.S. PATENT DOCUMENTS

| | | | |
|---|---|---|---|
| 7,054,273 B1* | 5/2006 | Scholtens et al. | 370/248 |
| 7,197,008 B1* | 3/2007 | Shabtay et al. | 370/218 |
| 7,330,437 B1* | 2/2008 | Gupta et al. | 370/241.1 |
| 2005/0099951 A1* | 5/2005 | Mohan et al. | 370/241 |
| 2005/0249124 A1* | 11/2005 | Elie-Dit-Cosaque et al. | 370/242 |
| 2005/0265231 A1* | 12/2005 | Gunther et al. | 370/225 |
| 2006/0031482 A1* | 2/2006 | Mohan et al. | 709/224 |
| 2007/0140126 A1* | 6/2007 | Osswald et al. | 370/236.2 |
| 2008/0112330 A1* | 5/2008 | He et al. | 370/241.1 |
| 2008/0285466 A1* | 11/2008 | Salam et al. | 370/241.1 |
| 2009/0034413 A1* | 2/2009 | Sajassi et al. | 370/228 |
| 2009/0073988 A1* | 3/2009 | Ghodrat et al. | 370/395.53 |

* cited by examiner

*Primary Examiner*—Kwang B Yao
*Assistant Examiner*—Candal Elpenord
(74) *Attorney, Agent, or Firm*—Clements Bernard PLLC; Christopher L. Bernard; Tyler S. Brown

(57) ABSTRACT

A method of fault notification in a carrier Ethernet having the capability of generating and transmitting OAM packets having flag fields, comprises inserting a bit in one of the flag fields to indicate the presence of service-affecting information in the OAM packets, detecting the presence of the inserted bit at the end of a data path, and performing a service protection action in response to the detection of the inserted bit prior to parsing the information in the message. One type of service protection action is protection switching.

7 Claims, 3 Drawing Sheets

CARRIER ETHERNET WITH FAULT NOTIFICATION

FIELD OF THE INVENTION

The present invention generally relates to fault notification in carrier Ethernets.

BACKGROUND OF THE INVENTION

Ethernet transport is an emerging opportunity for telecommunication carriers. The Ethernet transport network structure offers the potential to carry and deliver Ethernet connectivity with different types of services having many combinations of quality objectives, such as loss, delay and bandwidth. The Ethernet technology is undergoing a significant transformation to bring it to a level that is carrier-grade with the required management and protection functionality.

One aspect of the technology that is being enhanced is the ability to perform Operation Administration and Maintenance (OAM) functions. A key function is the ability to detect faults in the network and react in a manner to avoid impacting the customer services. To detect faults, special packets can be inserted in the data path to indicate the loss of connectivity. In the ITU-T Y.1731 standard, such packets are referred to as Continuity Check Messages (CCM) packets. The format of a CCM message is shown in FIG. 1. The packet 101 is composed of different fields including a set of flags 102. One of the flags is a Remote Defect Indication (RDI) 103 which is set to one when the path is deemed defective and a protection switching action is required. Both the upstream end 105 and the downstream end 106 of a connection-oriented path 107 send regular CCM messages to the opposite ends of the path. If one end stops receiving some number (e.g., three) of consecutive CCM messages, the path is presumed to have failed, and the other end is notified by sending a CCM messages with the RDI bit 108 set to one.

Other information can be carried in a CCM message through the use of a Type Length Value (TLV) identifier 104 which indicates that the packet includes some further information to indicate the status of other aspects of the network that require handling by the end points. For example, if a port related to a service is blocked for some reason, a port TLV indicating this "fault" condition is included in the CCM message. InterfaceStatus and PortStatus TLV's can optionally be added to a CCM. PortStatus TLV indicates the ability of the port on the node 105, 106 to pass ordinary data. InterfaceStatus TLV indicates the status of the interface of the node where the CCM message is transmitted. Both status indicators are set independently of the RDI. In most cases, the presence of one or more of these TLV's in the CCM message indicates a service-affecting issue.

If there is a local failure at one end of the path, or a condition occurs where the path can pass traffic but the CCM messages are still functioning, only the troubled end of the path will be operationally set to down, but the other end will continue to transmit traffic in the reverse direction because it needs to be notified of the problem. In this case, the InterfaceStatus TLV can be used in the CCM PDU to indicate an administrative state change, and both ends of the path will switch to the protected path.

Nodes are generally architectured with a data path 105b, 106b and a control plane 105a, 106a. The data path is responsible for processing all the traffic and ensuring that the throughput of the line rate is maintained. The control plane is responsible for managing the node and processing events at a lower speed. The current procedure for finding TLV information and reacting in an appropriate time is to have the data path parse each CCM message in case TLV information is present. The problem is that the data path needs to be extremely fast to keep up with the line rate. Parsing of the CCM messages in real time to extract the TLV information is very difficult as the TLV information is optional and can appear in any order in the message. This procedure greatly impacts scalability and leads to poor reaction time.

SUMMARY OF THE INVENTION

In one embodiment, a method of fault notification in a carrier Ethernet having the capability of generating and transmitting OAM packets having flag fields, comprises inserting a bit in one of the flag fields to indicate the presence of service-affecting information in the OAM packets, detecting the presence of the inserted bit at the end of a data path, and performing a service protection action in response to the detection of the inserted bit prior to parsing the information in the message. One type of service protection action is protection switching. In one implementation, the OAM packets contain continuity check messages inserted in selected data paths to indicate the loss of connectivity, and the continuity check messages have continuity check flag fields in which the bit can be inserted.

In another embodiment, a method of fault notification in a carrier Ethernet having the capability of inserting continuity check messages in a selected data path to indicate the loss of connectivity, the messages having continuity check flag fields, comprises inserting the continuity check messages in a selected data path to indicate the loss of connectivity, terminating the insertion of the continuity check messages, detecting the interruption in the arrival of the continuity check messages at the end of the data path, and performing a service protection action in response to the detection of the interruption.

BRIEF DESCRIPTION OF THE DRAWINGS

The invention will be better understood from the following description of preferred embodiments together with reference to the accompanying drawings, in which.

DETAILED DESCRIPTION

Although the invention will be described in connection with certain preferred embodiments, it will be understood that the invention is not limited to those particular embodiments. On the contrary, the invention is intended to cover all alternatives, modifications, and equivalent arrangements as may be included within the spirit and scope of the invention as defined by the appended claims.

Figure 1:
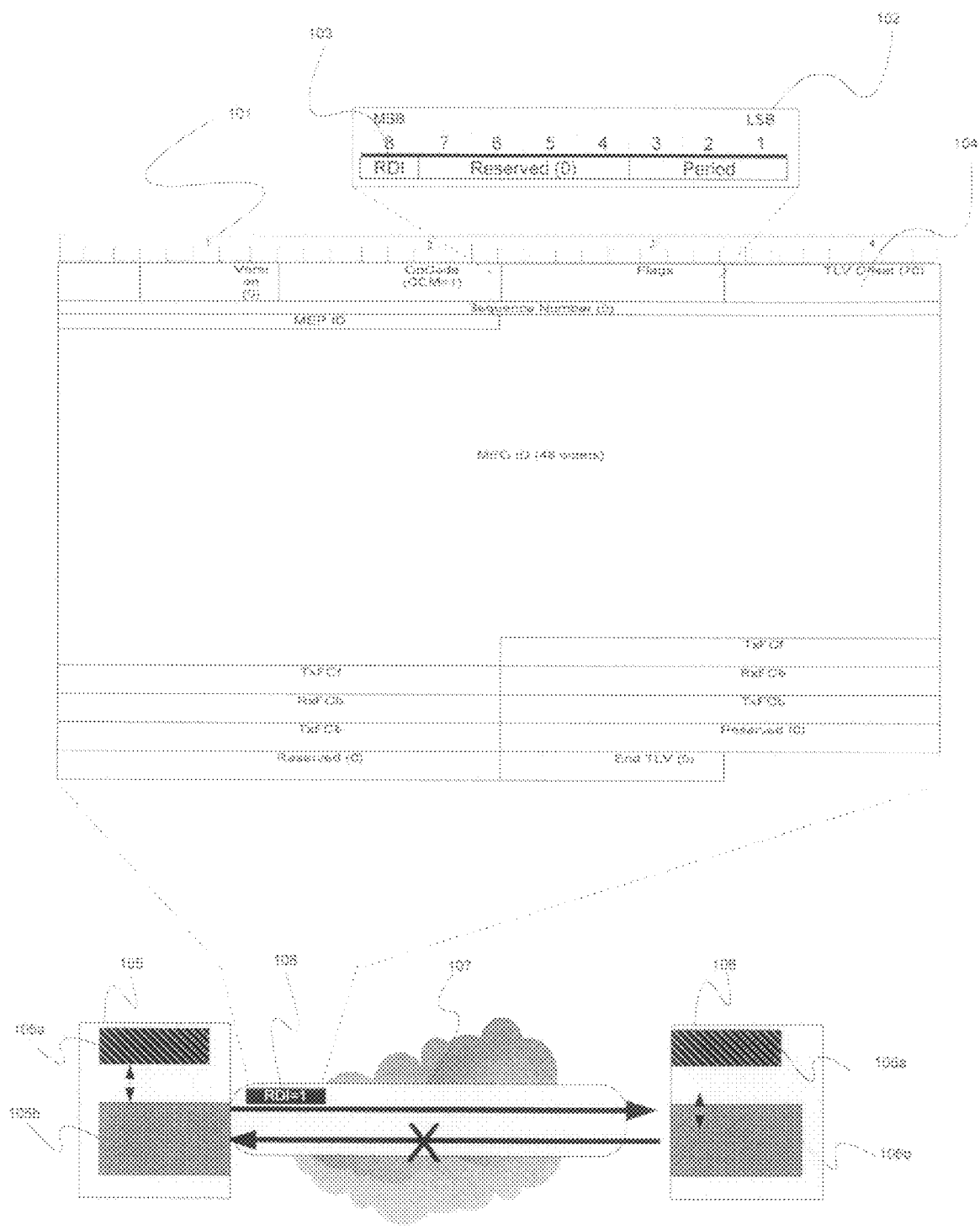
FIG. 1 is a diagram of the format of a CCM message.
Figure 2:
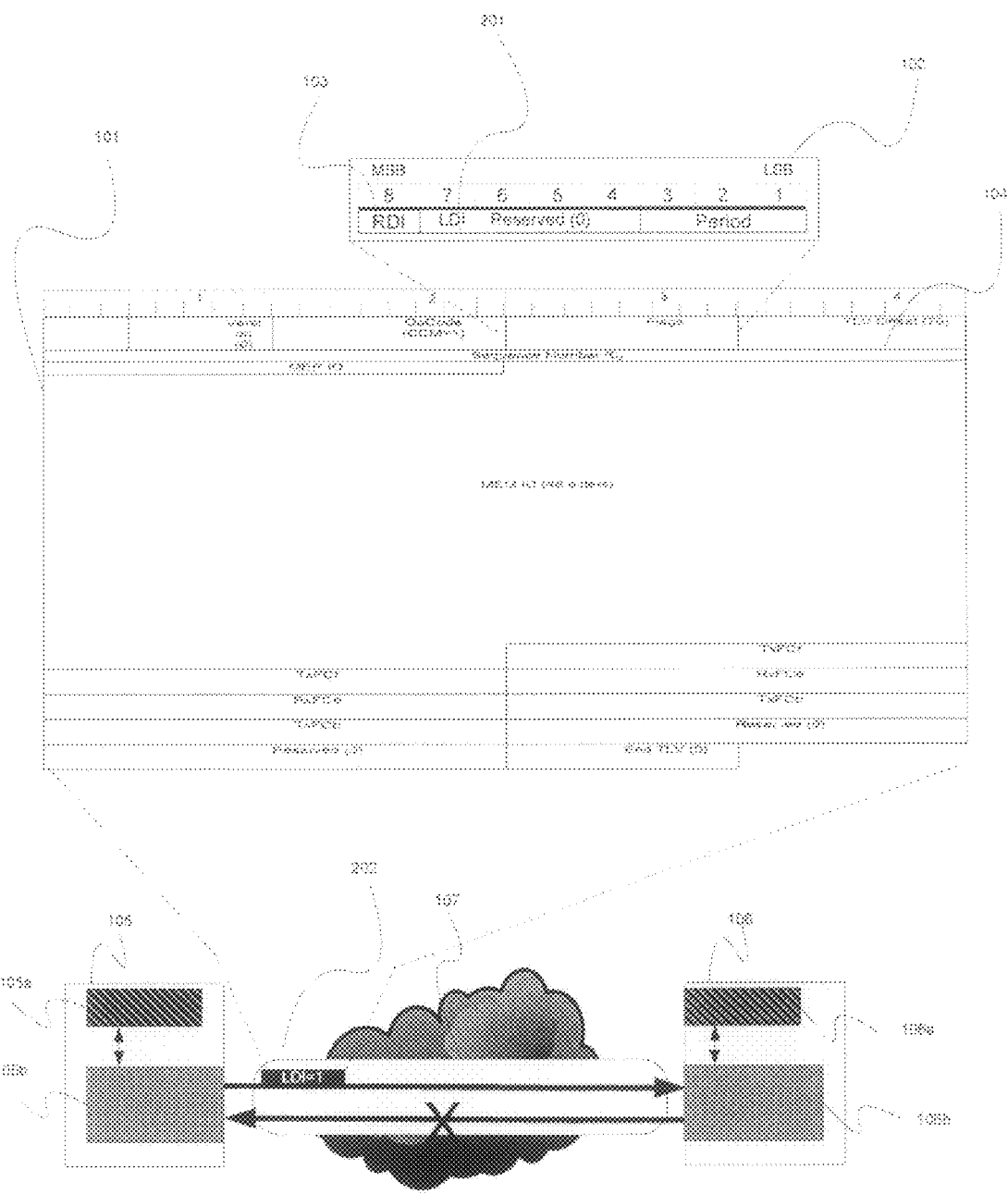
FIG. 2 is a diagram depicting the use of one bit to indicate the presence of service-affecting TLV information in a CCM message.

In the exemplary CCM message depicted in FIG. 2, a bit in the CC flag field 201 (bit #7 in this example) indicates the presence of a TLV that includes service-affecting information. When an upstream node 105 needs to send a CCM message 202 with a port or interface TLV indicating a local fault, a Local Defect Indicator (LDI) bit 201 in the CCM flag field 102 is set to one for all CCM message generated by the node 105. By default the LDI is set to zero. The data path end point (or downstream node) 106b reacts immediately to the LDI bit, without parsing the entire packet for the TLV information, and performs the required service protection action (for example protection switching). The control plane 106a can handle the parsing of the message, at a lower speed, to identify the reasons for the protection switching and perform the relevant actions without affecting scalability, throughput of the interface or service quality (e.g., by not performing the protection switching fast enough).

An alternative procedure is to have the upstream node 105 stop sending the CCM messages to the other end instead of setting the TLV's. The downstream node 106 detects the missing CCM's, assumes the path has failed and performs the required actions (e.g., protection switching). This procedure is useful when the downstream node 106 does not recognize the TLV's in the CCM messages.

Figure 3A:
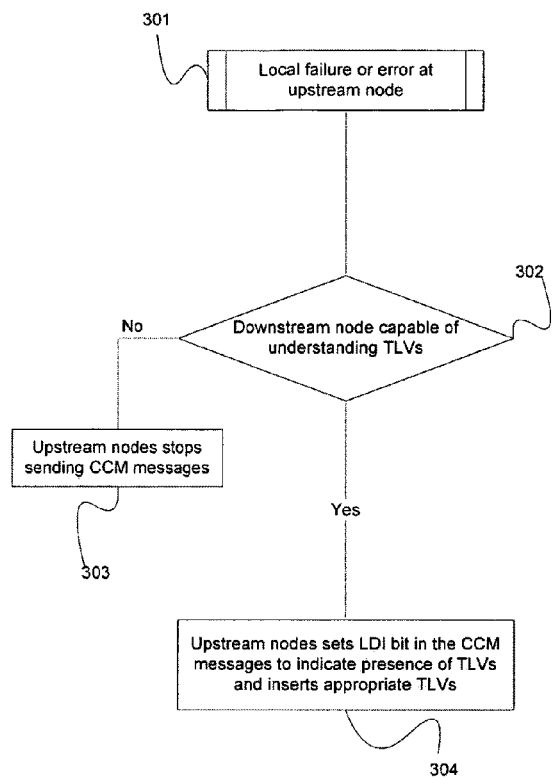
FIGS. 3A-3C are flow charts of the different modes of operations of systems using the CCM message depicted in FIG. 2 or an alternative procedure.
Figure 3B:
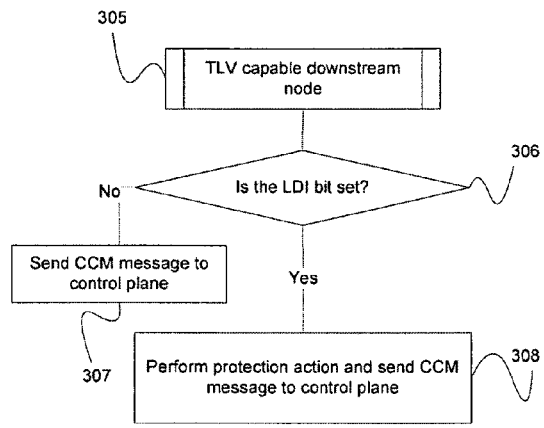
Figure 3C:
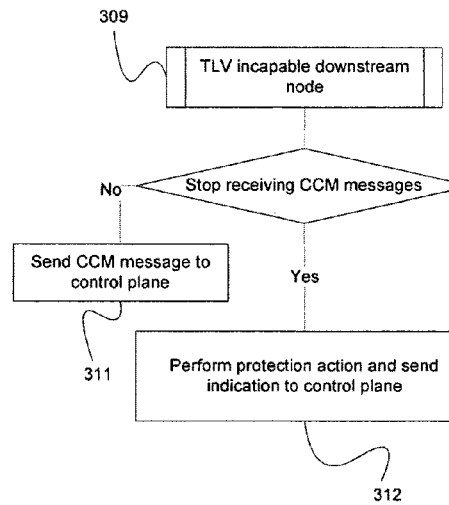

FIGS. 3A-3C are flow charts for both procedures. In the procedure illustrated in FIG. 3A, when an error or local failure happens at the upstream node 301, step 302 checks whether the downstream node at the end of the path is capable of understanding the TLV's. If the downstream node is capable, the upstream node sets the LDI bit to one and inserts the appropriate TLV's at step 304. If the downstream node is not capable of understanding the TLV's, the sending of CCM messages is terminated at step 303.

Referring next to FIG. 3B, a downstream node 305 capable of understanding TLV's check the LDI bit in the CCM message at step 306 to determine whether the LDI bit is set to one. If so, the required protection action is performed at step 308 and the CCM message is sent to the control plane. If step 306 determines that the LDI bit is not set to one, then step 307 simply forwards the CCM message to the control plane for processing.

As illustrated in FIG. 3C, a downstream node 309 that is incapable of understanding TLV's, simply monitors whether it is receiving CCM messages, at step 310. When the CCM messages are received they are sent to the control plane for processing at step 311. If the downstream node judges that it is not receiving CCM messages at step 310, then the required protection action is performed at step 312 and an indication is sent to the control plane.

The above procedures are not limited to the use of Y.1731 or 802.1ag CCM messages, and can be applied to other technologies using similar types of messages, such as PBT technologies where the setting of an RDI bit immediately triggers a tunnel protection switching action.

Those skilled in the art will recognize that various modifications and changes could be made to the invention without departing from the spirit and scope thereof. It should therefore be understood that the claims are not to be considered as being limited to the precise embodiments set forth above, in the absence of specific limitations directed to each embodiment.

The invention claimed is:

1. A method of fault notification in a carrier Ethernet operable for generating and transmitting OAM packets having flag fields, comprising:
   responsive to a local failure or error at a first carrier Ethernet node and if a second carrier Ethernet node is capable of parsing time length value (TLV) identifiers, inserting a bit in a local defect indicator (LDI) field to indicate the presence of service-affecting information in the OAM packets, otherwise terminating insertion of continuity check messages at the first carrier Ethernet node,
   at the second carrier Ethernet node, detecting the presence of the inserted bit at the end of a data path or the absence of the continuity check messages,
   at the second carrier Ethernet node, performing a service protection action in response to the detection of the local failure or error, and
   at the second carrier Ethernet node, subsequent to the service protection action, parsing information in an associated message using a control plane, wherein the parsing comprises:
      if the second carrier Ethernet node is capable of parsing TLV identifiers, parsing the information at the second carrier Ethernet node in the TLV identifiers subsequent to the service protection action; and
      if the second carrier Ethernet node is incapable of parsing TLV identifiers, transmitting from the first carrier Ethernet node and receiving at the second carrier Ethernet node an indication of the service protection action subsequent to the service protection action.

2. The method of claim 1 in which the OAM packets contain continuity check messages inserted in selected data paths to indicate the loss of connectivity, the continuity check messages having continuity check flag fields in which the bit is selectively inserted.

3. The method of claim 1 in which the service protection action comprises protection switching.

4. A method of fault notification in a carrier Ethernet operable for inserting continuity check messages in a selected data path to indicate the loss of connectivity, the messages having continuity check flag fields, comprising:
   at a first carrier Ethernet node, inserting the continuity check messages in a selected data path to indicate the loss of connectivity,
   at the first carrier Ethernet node and if the second carrier Ethernet node is incapable of understanding time length value (TLV) identifiers, terminating the insertion of the continuity check messages, and if the second carrier Ethernet node is capable of understanding TLV identifiers, inserting a bit in a local defect indicator (LDI) field to indicate the presence of service-affecting information in the continuity check messages,
   at a second carrier Ethernet node, detecting the interruption in the arrival of the continuity check messages at the end of the data path or the LDI field,
   at the second carrier Ethernet node, performing a service protection action in response to the detection of the interruption or the LDI field,
   if the second carrier Ethernet node is capable of parsing TLV identifiers, parsing the information at the second carrier Ethernet node in the TLV identifiers subsequent to the service protection action,
   if the second carrier Ethernet node is incapable of parsing TLV identifiers, transmitting from the first carrier Ethernet node and receiving at the second carrier Ethernet node an indication of the service protection action subsequent to the service protection action, and
   at the second carrier Ethernet node, subsequently sending an indication of the service protection action to a control plane.

5. The method of claim 1 further comprising:
   at the first carrier Ethernet node, inserting information based upon the local failure or error in a time length value (TLV) identifier;
   wherein the second carrier Ethernet node parses the information in the time length value (TLV) identifier subsequent to the service protection action.

6. The method of claim 5 further comprising:

if the second carrier Ethernet node is incapable of parsing the time length value (TLV) identifier, then terminating the insertion of the continuity check messages at the first carrier Ethernet node.

7. A method of carrier Ethernet fault notification comprising:

communicating packets between a first node and a second node;

responsive to a local fault or error at the first node and if the second node is capable of parsing time length value (TLV) identifiers, inserting a bit in a local defect indicator (LDI) field and information in a TLV identifier based upon the local failure or error to indicate the presence of service-affecting information in one of the packets;

responsive to a local fault or error at the first node and if the second node is incapable of parsing TLV identifiers, terminating insertion of the continuity check messages at the first node;

at the second node, detecting one of the bit in the LDI field or the termination of continuity check messages;

performing a service protection action in response to the detection of the interruption in the detecting step;

if the second node is capable of parsing TLV identifiers, parsing the information at the second node in the TLV identifiers subsequent to the service protection action; and if the second node is incapable of parsing TLV identifiers, transmitting from the first node and receiving at the second node an indication of the service protection action subsequent to the service protection action.

* * * * *